(12) United States Patent
Matsubara (10) Patent No.: US 6,188,487 B1
(45) Date of Patent: Feb. 13, 2001

(54) PRINT CONTROL SYSTEM AND PRINT CONTROL METHOD

(75) Inventor: Yoshiharu Matsubara, Kanagawa (JP)

(73) Assignee: Fuji Xerox Co., LTD, Tokyo (JP)

( * ) Notice: Under 35 U.S.C. 154(b), the term of this patent shall be extended for 0 days.

(21) Appl. No.: 09/128,768

(22) Filed: Aug. 4, 1998

(30) Foreign Application Priority Data

Aug. 5, 1997 (JP) .................................................. 9-210354

(51) Int. Cl.[7] .................................................. G06F 15/00
(52) U.S. Cl. ........................ 358/1.15; 358/1.3; 358/1.4; 709/203
(58) Field of Search ................................ 358/1.1, 1.6, 1.8, 358/1.12, 1.13, 1.14, 1.15, 1.16, 400, 402, 442, 468; 709/203, 225, 226, 208, 209; 710/36, 38, 40

(56) References Cited

U.S. PATENT DOCUMENTS

| 5,655,152 | * | 8/1997 | Ohnishi et al. | 710/36 |
| 5,802,260 | * | 9/1998 | Shimakawa et al. | 358/1.15 |
| 5,937,150 | * | 8/1999 | Phan | 358/1.15 |
| 5,995,721 | * | 11/1999 | Rourke et al. | 358/1.15 |

FOREIGN PATENT DOCUMENTS

| 5-204565 | 8/1993 | (JP) . |
| 5-216842 | 8/1993 | (JP) . |
| 5-274098 | 10/1993 | (JP) . |

* cited by examiner

Primary Examiner—Edward L. Coles
Assistant Examiner—Mark Wallerson
(74) Attorney, Agent, or Firm—Finnegan, Henderson, Farabow, Garrett & Dunner, L.L.P.

(57) ABSTRACT

A print control system and a print control method thereof are disclosed. The print control system comprises a print instruction system issuing a print request for printing a print object, and a plurality of print servers connected to the print instruction system through a data communication network, the respective print server having a print processing device for printing out the print object. The control method comprises the steps of outputting a print job processing request as the print request from the print instruction system to the plurality of print servers, generating and memorizing a virtual job corresponding to the print request in response to the print job processing request in each of the print servers, outputting a printable response in response to the print job processing request from the each print server to the print instruction system when the each print server becomes ready for processing the virtual job, transferring the print object from the print instruction system to a first print server which reply the printable response, and printing out the print object by the print processing device connected to the first print server.

17 Claims, 8 Drawing Sheets

PRINT CONTROL SYSTEM AND PRINT CONTROL METHOD

BACKGROUND OF THE INVENTION

1. Technical Field of the Invention

The present invention relates to a print control system and a print control method and more particularly to a print control system and a print control method for efficiently printing out at a plurality of printers connected to a network in response to print requests from print instruction systems of client systems connected to the network.

2. Description of the Related Art

While construction of a network system increases rapidly, the number and quality of printers that can be used by the users improve with high functions and low costs of printers in recent years; a printing system comprising various printers connected to a network for operating the printers in parallel becomes pervasive. However, when the printers connected to the network are available, often they are not necessarily used efficiently. On the contrary, to efficiently use the printers, some restriction or load, such as new operation required for setting specification of the printer to be used, is imposed on the users.

Problems in a conventional general print control system using printers connected to a network to execute print processing are described on the following topics:

(i) Selection of printer with light load

In the conventional system, the processing time of jobs is predicted with respect to all printers as output destination candidates and a print request is issued to the printer whose load is estimated to be the lightest from the prediction result. In this method, however, it is hard to calculate precise load and if the estimated load differs largely from the actual load, the load on the printer is furthermore increased.

(ii) Simultaneous output to printers

In the conventional system, the same print job is issued to all printers as output destinations and all print objects required for print processing are also stored in the printers. In this method, however, print jobs and print objects are all managed in the printers, thus all printers need to provide resources uniformly and it is difficult to generate reliable print jobs for all printers.

(iii) Selection of optimum printer for printing out

In the conventional system, an optimum printer for print job processing is selected based on information on all printers as output destination candidates. In this method, however, printer information required for determining the optimum printer needs to be managed intensively and if a new printer is added or change in the printer operation state such as toner out occurs, the corresponding information needs to be updated whenever necessary. Further, in determination processing for selecting the optimum printer, if new print processing becomes available, a new expression for adaptation evaluation concerning the new print processing needs to be built in the determination processing.

(iv) Changing printers for printing out

In the conventional system, if some trouble occurs in the printer executing a print job processing, the print job is transferred to another operating printer for changing the output destination as a method of changing the printer for performing the print job processing. In this method, however, whenever printer trouble occurs, the print job is transferred, thus load on the network increases and at the worst, if trouble occurs consecutively in the printer to which the print job is transferred, fruitless network traffic is generated and load on all printers is increased.

SUMMARY OF THE INVENTION

It is an object of the present invention to provide a print control system and a print control method enabling efficient use of a plurality of printers at the minimum user's expense to solve the above-described problems in a print control system using a plurality of printers connected to a network.

To the end, according to the present invention, there is provided a print control system comprising: a print instructing system issuing a print request for printing a print object; and a plurality of print servers connected to the print instruction system through a data communication network, the respective print server having a print processing device for printing out the print object, wherein the print instruction system outputs a print job processing request as the print request to the plurality of print servers and transfers the print object to a first print server which reply a printable response in response to the print job processing request, and wherein each of the print servers generates and memories a virtual job corresponding to the print request in response to the print job processing request, and outputting the printable response at the time of being ready for processing the virtual job.

In the system, the print instruction system includes a job management server which generates and memorizes a print job containing an attribute data including selection information for the print processing device executing the print request.

In the system, the job management server includes a virtual job list for relating a plurality of virtual jobs generated by the print serves to the print job and indicating the correspondence between the virtual jobs and generating print servers, and selects a print server generating a virtual job corresponding to the print job with reference to the virtual job list.

In the system, the job management server instructs the first print server to process the virtual job and transfers the print object thereto.

In the system, the job management server instructs print serves other than the first print server to put the processing of the virtual job on hold.

In the system the job management server may instruct all print servers replying the printable response to process the virtual job and transfers the print object thereto.

In the system, the print job contains adaptation condition expressions for calculating an evaluation value to select a candidate print server for processing the virtual job, and wherein the print server calculates the adaptation condition expressions to determine the evaluation value based on operation state of the print processing device attached thereto and notifying the evaluation value to the job management server, and the job management server selects the candidate print server based on the evaluation value.

In the system, the print server processing the virtual job issues a virtual job release request to the job management server when the output of the print object is interrupted, and thereby the job management server selects next print server for processing the interrupted virtual job based on the selection information for the print processing device executing the print request contained in the print job and instructs the selected print server to process the interrupted virtual job.

In the system, the print server includes a virtual job storage section capable of storing a plurality of virtual jobs, selects one virtual job from the plurality of virtual jobs, and is operated by a job state data contained in the selected virtual job.

In the system, the job state data having a value as a data indicating one state of "processing", "processing wait", "instruction wait", and "idling", and wherein the print server executes the process of the virtual job with the print processing device attached thereto when the job state indicates the "processing wait", notifies the printable response to the print instruction system when the job state data indicates the "idling", and selects another virtual job stored in the virtual job storing section and executes a process of the next virtual job with reference to a job state data contained by the next virtual job when the job state data indicates one of the "processing" and "instruction wait".

In the system, the job management server includes a print object storage section for storing the print object containing a print data, and the print servers load the print object from the print object storing section when the processing of the virtual job is instructed by the job management server.

In the system, the print servers output a printable response signal as the printable response at the time of being ready for processing the virtual job.

In the system, the print servers may output a identification data indicating whether the virtual job can be processed as the printable response.

According to the present invention, a method for controlling a printing with respect to the print control system can be described as follows.

The print control method comprises the steps of: outputting a print job processing request as the print request from the print instruction system to the plurality of print servers; generating and memorizing a virtual job corresponding to the print request in response to the print job processing request in each of the print servers; outputting a printable response in response to the print job processing request from the each print server to the print instruction system when the each print server becomes ready for processing the virtual job; transferring the print object from the print instruction system to a first print server which reply the printable response; and printing out the print object by the print processing device connected to the first print server.

In the method, the print instruction system instructs print servers other than the first print server to put the process of the virtual job on hold when the print object is transferred to the first print server.

In the method, the print instruction system instructs print servers other than the first print server to cancel the process of the virtual job after printing out of the print object.

In the method, the print instruction system transfers the print object a first print server among the print servers other than the first print server when the printing out of the print object is interrupted.

DETAILED DESCRIPTION OF THE PREFERRED EMBODIMENT

Figure 1:
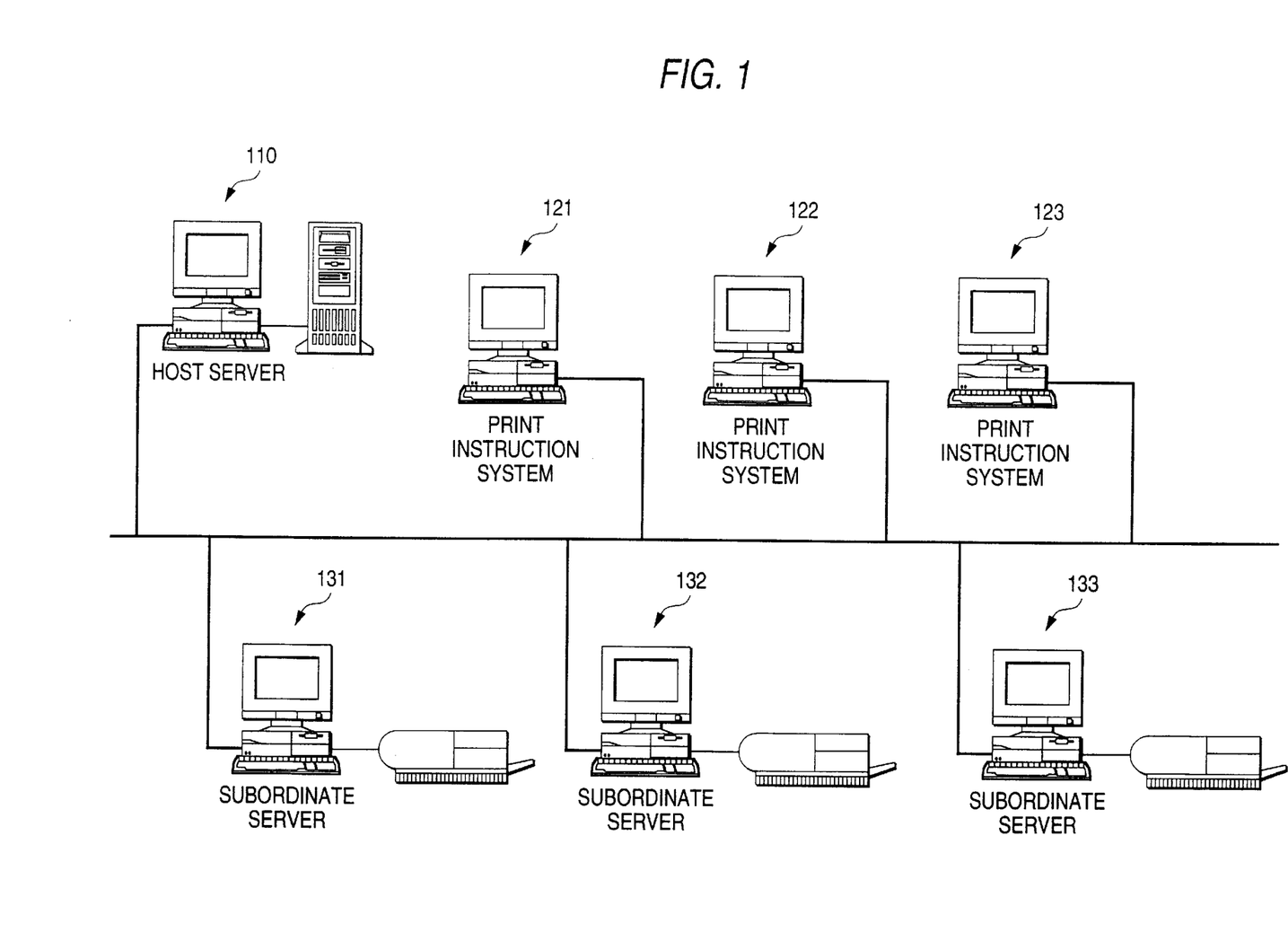
FIG. 1 is an illustration to show a system configuration example incorporating a print control system according to the present invention.

FIG. 1 shows a system configuration example incorporating a print control system of the present invention. As shown in FIG. 1, the print control system comprises a plurality of print instruction systems 121, 122, and 123, a plurality of print servers (subordinate servers) 131, 132, and 133, and a job management server (host server) 110, which are connected by a network.

In the embodiment, an example will be discussed in which the print instruction systems, the print servers (subordinate servers), and the job management server (host server) are connected separately to the network. In addition, for example, if the print instruction system contains the host server function or is connected above the host server connected to the network, the print control system and the print control method of the present invention can also be realized.

The print instruction systems 121, 122, and 123 are client systems for the user to enter predetermined data and send a print instruction. The print instruction systems operate independently and print instructions compete with each other in the whole print control system connected by the network.

The job management server 110 receives print requests from the print instruction systems 121, 122, and 123. The print requests are transmitted from the client systems in units involving a given amount of print data (job unit).

The print servers 131, 132, and 133 are assigned print requests received by the job management server 110 and execute the assigned print. Each print server is provided with a printer and executes the print at the attached printer. The printers have not necessarily the same functions; for example, the printers may or may not have a double-sided print function, a color print function, etc. The available paper size also varies from one printer to another.

When each print server becomes ready for printing a job, it outputs a print ready signal for the job and the print instruction system or the job management server detects the signal or each print server has a flag indicating the ready state for printing each job and the print instruction system or the job management server detects the flag, whereby the print instruction system or the job management server can check the virtual job processing enable state in each print server.

The above-described members realize the print control system and the print control method of the present invention. The invention will be discussed in detail with reference to FIG. 2.

Figure 2:
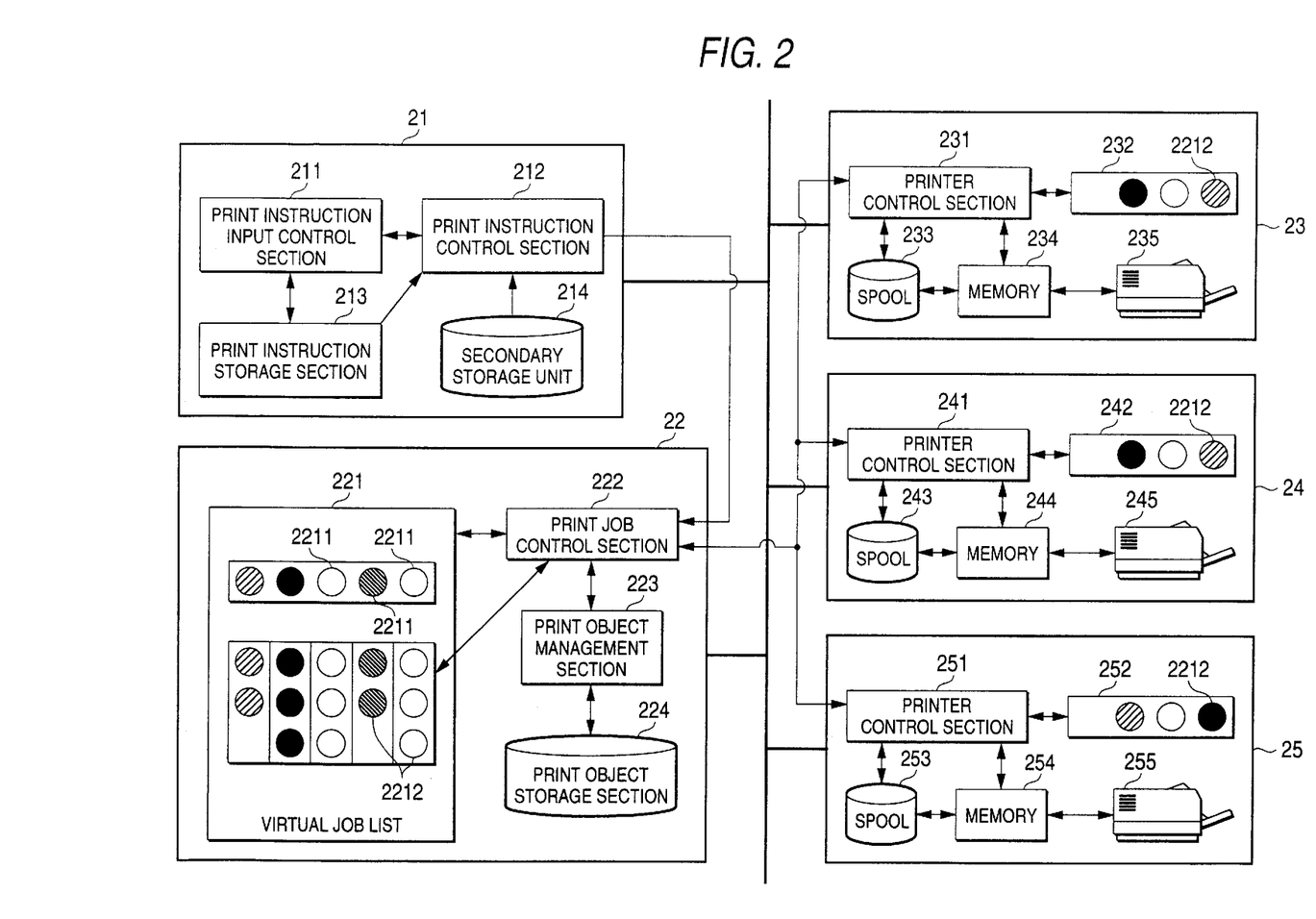
FIG. 2 is a block diagram to show details of members of the print control system according to the present invention.

FIG. 2 is a block diagram to show details of members similar to those shown in FIG. 1, a job management server (host server), print servers (subordinate servers), and a print instruction system, which are connected by a network. In the print control system shown in FIG. 2, only one print instruction system is shown, but other print instruction systems may be connected to the print control system of the present invention and the number of print servers is not limited to that shown in FIG. 2.

The print instruction system 21 has a print instruction input control section 211, a print instruction control section 212, a print instruction storage section 213, and a secondary storage unit 214, as shown in FIG. 2. It is a so-called client system for the user to make a print request and displays print instruction information on a display, for example, for the user to edit the information for setting a print instruction, then issues a print request for print processing based on the setup print instruction to the job management server.

The print instruction input control section 211 displays print instruction information for the user, accepts input concerning a print instruction from the user, stores accepted input information in the print instruction storage section 213, and requests the print instruction control section 212 to send a print instruction based on the stored information. The print instruction storage section 213 stores the print instruction information accepted in the print instruction input control section 211. The print instruction control section 212 issues data to be printed, stored in the secondary storage unit 214 together with a print request to the job management server 22 based on the instruction indicated in the information stored in the print instruction storage section 213 in response to a request from the print instruction input control section 211. The secondary storage unit 214 is a place for storing the data to be printed.

The job management server 22 accepts a print request from the print instruction system 21, generates a print job and a print object, and processes them. It controls data communication and processing of print jobs, virtual jobs, and print objects with printer control section 231, 241, and 251 in the print servers 23, 24, and 25 connected by the network.

A print job storage section 221 is a storage section for retaining print requests accepted from the print instruction system 21 as print jobs 2211 having various attribute data pieces concerning the print requests. The print job storage section 221 in the embodiment also retains a virtual job list of information concerning virtual jobs 2212 generated in the print servers corresponding to the print jobs 2211.

Each virtual job 2212 is a job generated in the printer control section 231, 241, 251 in the print server 23, 24, 25 connected by the network in response to a request from a print job control section 222 when the print job 2211 is processed, and has information exchanged among the print job control section 222, a print object management section 223, and the printer control section 231, 241, 251 for processing the print job 2211. The information contained in the print job and the virtual job will be discussed later in detail.

The print job control section 222 accepts a print request from the print instruction system 21, generates a print job 2211, and requests the print object management section 223 to generate a print object. It also determines printer candidates for printing out based on information specified for the print job 2211 and issues a virtual job 2212 print processing request to the printer control sections 231, 241, and 251. Further, the print job control section 222 performs appropriate processing based on the information specified in the print job 2211 and information from the printer control section 231, 241, 251 in response to a "virtual job enabling request" notified to indicate a printable state or a "virtual job release request" indicating trouble occurrence during printing from the printer control section 231, 241, 251. For example, an output printer is selectively determined based on the information specified in the print job and printer information in response to "virtual job enabling requests" from the printer control sections of the print servers, and another printer is selected as an output continuing printer in response to a "virtual job release request."

The print object management section 223 accepts a print object generation request made by the print job control section 222 and stores the request in a print object storage section 224 described later. The print object is the data to be printed, accepted together with a print request issued by the print instruction system 21 and information used by the printer control section in the print server in print processing. The print object management section 223 further accepts a print object acquirement request, a print object release request, and a print object update request made by the printer control sections 231, 241, and 251 and changes the information stored in the print object storage section 224 accordingly.

The print object storage section 224 retains print objects provided in a one-to-one correspondence with print jobs.

The print servers 23, 24, and 25 generate and process virtual jobs in response to print requests from the job management server 21, and print. They basically have a similar configuration and the members of the print server 23 will be discussed.

The printer control section 231 accepts a virtual job 2212 processing request from the print job control section 222 in the job management server 22 and generates and updates virtual job 2212. To process the virtual job 2212, the printer control section 231 generates and processes a job enabling request, a job release request for the print job control section. Further, to process the print object corresponding to the virtual job 2212, the printer control section 231 generates and processes a print object acquirement request, update request, release request for the print object storage section 224 in the job management server 22. It also acquires the print object and performs print processing.

A virtual job storage section 232 retains virtual jobs generated by the printer control section 231. Spool 233 and a memory 234 store print data and control information concerning a print object accepted by the printer control section 231 and passes them to a printer 235, which then executes print processing for the print object.

Next, data contained in a print job generated and retained in the job management server and a virtual job generated in print server corresponding to the print job will be discussed in detail. First, the attribute stored as the print job are as follows:

(i) Printer list

The printer list is a list of printers as candidates for printing out. If output destination priority specification according to printer selection condition described later is not contained in the print request, printers as candidates for printing out are selected according to the order recorded in the printer list.

(ii) Print job state

The print job state indicates the state of the print job. The print job state is either of the following responsive to the processing state:

Processing

Indicates the print processing state.

Processing wait

Indicates the print processing wait state. If the print job control section makes a processing start request for the print job waiting for an instruction, the print job enters the "processing wait" state.

(iii) Print instruction attributes

The print instruction attributes are processing attributes of paper size, the number of print sheets, scale, collation, color print, etc., required for print processing. Two numeric values used in evaluation of a printer adaptation condition expression described later and numeric operation on the numeric value (for example, multiplication or addition) can be specified in the attribute. In operations with the printer adaptation condition expressions using the numeric values set as the print instruction attributes, an evaluation is performed in the attribute order set in the print instruction attributes. An evaluation example of the printer adaptation condition expressions will be discussed later.

(iv) Printer adaptation condition expression

The printer adaptation condition expression is a condition expression for performing an evaluation based on the operation state of the printer of the output unit attached to each print server. It is used to calculate the evaluation value of the operation state buy the printer control section. It is specified to furthermore limit output destination candidates in a printer list or control the output destination candidate order, whereby dynamic printer change at the printing time can be executed efficiently.

The printer adaptation condition expression is defined by two numeric values assigned to each attribute defined in the print instruction attributes and simple numeric operation on the numeric value (multiplication or addition).

The two numeric values assigned to each print instruction attribute are 0 or positive values of 1 or more. One numeric value is selected when the print attribute can be handled (adaptable) and the other is selected when the print attribute cannot be handled (not adaptable). Numeric operations are performed on the selected numeric values for the attributes. For example, either multiplication or addition can be selected as the operation.

The printer control section 231 in the print server selects either of the numeric values (adaptable or not adaptable) specified in each print instruction attribute in conformance with the printer operation state and performs the numeric operations on the numeric values for evaluating the numeric values sequentially. The sequential operations are evaluated in the numeric value setting order in the print instruction attributes as described above.

For example, supposing the print attribute instructions and condition expressions are set as shown in the following table.

| | | condition expression | | |
|---|---|---|---|---|
| order | attribute | adaptable | not adaptable | operation |
| 1 | double-sided print | 3 | 1 | + |
| 2 | scaled-down print | 3 | 1 | + |
| 3 | color print | 5 | 0 | * |
| 4 | paper size | 5 | 0 | * |

+: addition
*: multiplication

In this case, the evaluation expressions are as follows:

(((([initial value: 0]

[operation in 1: +][numeric values in 1: 3:1])

[operation in 2: +][numeric values in 2: 3:1])

[operation in 3: *][numeric values in 3: 5:0])

[operation in 4: *][numeric values in 4: 5:0])

In these expressions, either value is selected for each of [numeric values in 1: 3:1], [numeric values in 2: 3:1], [numeric values in 3: 5:0], and [numeric values in 4: 5:0] in response to the printer state. For example, if double-sided print is adaptable, 3 is selected for the numeric value in 1; if double-sided print is not adaptable, numeric value 1 is selected. In the adaptation expressions, multiplication is performed on "color print" and "paper size" and if "not adaptable" is selected in either condition, the operation result becomes 0. The higher the numeric value obtained in the operations according to the expressions, the higher the adaptability.

The operation result according to the expression becomes the adaptation value of the printer for the specified print instruction attributes. Further, if the operation result if 0, the printer is assumed to be not adaptable and is excluded from the printers for printing out. Thus, if 0 is set as the numeric value corresponding to "not adaptable" for an important print instruction attribute and the last evaluation order is applied to the attribute with multiplication operation, the printers not adaptable to the important print instruction attribute can be excluded from the printers for printing out.

The adaptation operation expressions are taken as an example; it is desirable to form adaptation expressions considering the printer system on the whole network by adding attributes other than the above-mentioned attributes and setting other values than the above-mentioned values.

Next, the data contained in a virtual job will be discussed in detail. The virtual job is a job generated by the printer control section 231, 241, 251 in the print server 23, 24, 25 in response to a request from the print job control section 222 in the job management server 22 in print job processing. It retains information exchanged among the print job control section 222, the print object management section 223, and the printer control section 231, 241, 251 for processing the print job.

The virtual job retains the following attributes:
(i) Print object ID

The print object ID is an identifier (ID) for identifying the print object to be processed by the print job corresponding to the virtual job.
(ii) Virtual job state The virtual job state indicates the state of the virtual job. The virtual job state is any of the following responsive to the processing state:
Processing Indicates the print processing state.
Processing wait Indicates the print processing wait state. If the print job control section makes a processing start request for the virtual job waiting for an instruction, the virtual job enters the processing wait state.
Instruction wait Indicates the wait state for an instruction from the print job control section.
Idling A state in which processing for the virtual job is not determined. If the virtual job in this state becomes to be processed, a 222 in the job management server 22. As a result, if processing is permitted, the virtual job enters the "processing wait" state: otherwise, the virtual job enters the "instruction wait" state.

Next, the data contained in a print object will be discussed. The print object retains the data to be printed, accepted together with a print request issued by the print instruction system 21 and information used by the printer control section 231, 241, 251 in the print server 23, 24, 25 in print processing.

The information retained in the print object and used in print processing includes a virtual job list. The virtual job list is information concerning virtual jobs accessing the print object. It is a list for identifying virtual jobs generated separately by the printer control sections 231, 241, and 251 in the print servers 23, 24, and 25 corresponding to the print job generated in the job management server 22 in response to a print request issued from the print instruction system 21.

The virtual job list may relate the listed virtual jobs to the print objects and may be retained in another storage section in the job management server 22, for example, the print job storage section as shown in FIG. 2.

Figure 3:
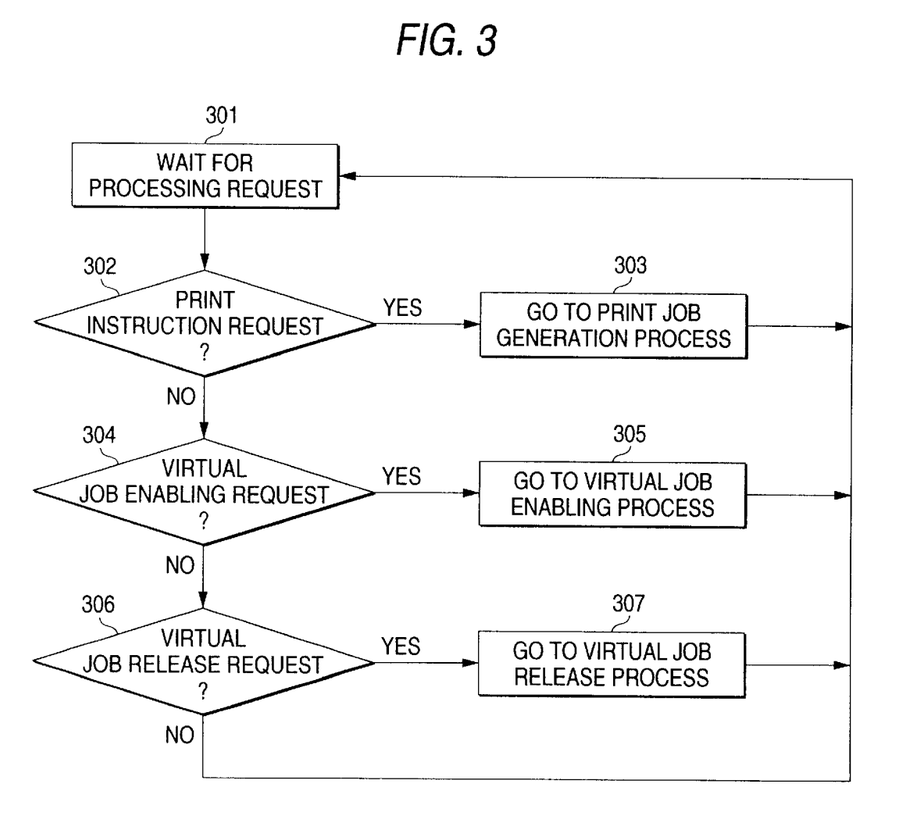
FIG. 3 is a flowchart to show a process flow in a job management server in the print control system of the present invention.

Next, a processing flow in the job management server will be discussed with reference to FIG. 3. First, the job management server 22 waits for a print processing request at step 301. Processing requests received by the job management server 22 include a print instruction request from the print instruction system 21 and virtual job enabling and release requests from the printer control section in each print server. If the processing request is a print instruction request from the print instruction system 21 at step 302, a print job generation process is executed at step 303. If the processing request is a virtual job enabling request at step 304, a virtual job enabling process is executed at step 305. If the processing request is a virtual job release request at step 306, a virtual job release process is executed at step 307.

The print job generation process at step 303 is a process for generating a print job 2211 containing a printer list, print job state, print instruction attributes, and printer adaptation condition expressions as attributes, as described above, according to print parameters, etc., sent from the print instruction system 21 when the print instruction system 21 makes a print request.

The virtual job enabling process at step 305 is a process for acquiring the virtual job 2212 corresponding to the print job 2211 generated at step 303. The virtual job 2212 is a job generated by the printer control section in the print server in response to a request from the print job control section 222 in the job management server 22 in print job processing as described above. It retains information exchanged among the print job control section 222, the print object management section 223, and the printer control sections 231, 241, and 251 for processing the print job. The virtual job 2212 retains the print object ID and virtual job state as attributes, as described above. The printer server is enabled to execute print processing by entering the job state of the virtual job 2212 in the "processing wait" state.

The virtual job release process at step 307 is a process responsive to a job release request issued by the printer control section in the print server to the print job control section 222 in the job management server 22 if it becomes impossible to continue processing due to some trouble occurring while the printer control section in the print server is processing a virtual job. In response to the request, the print job control section 222 in the job management server 22 selects a printer as another candidate for printing out from the printer list in the print job 2211 and sends a virtual job enabling request to the printer control section of the selected printer. When selecting the candidate for printing out, if the print job 2211 contains printer adaptation condition expressions, the print job control section 22 again requests the printer control sections 231, 241, and 251 to perform evaluation at the point in time, then sends a virtual job enabling request to the printer control section providing the optimum evaluation based on the evaluation results returned from all printer control sections 231, 241 and 251.

Figure 4:
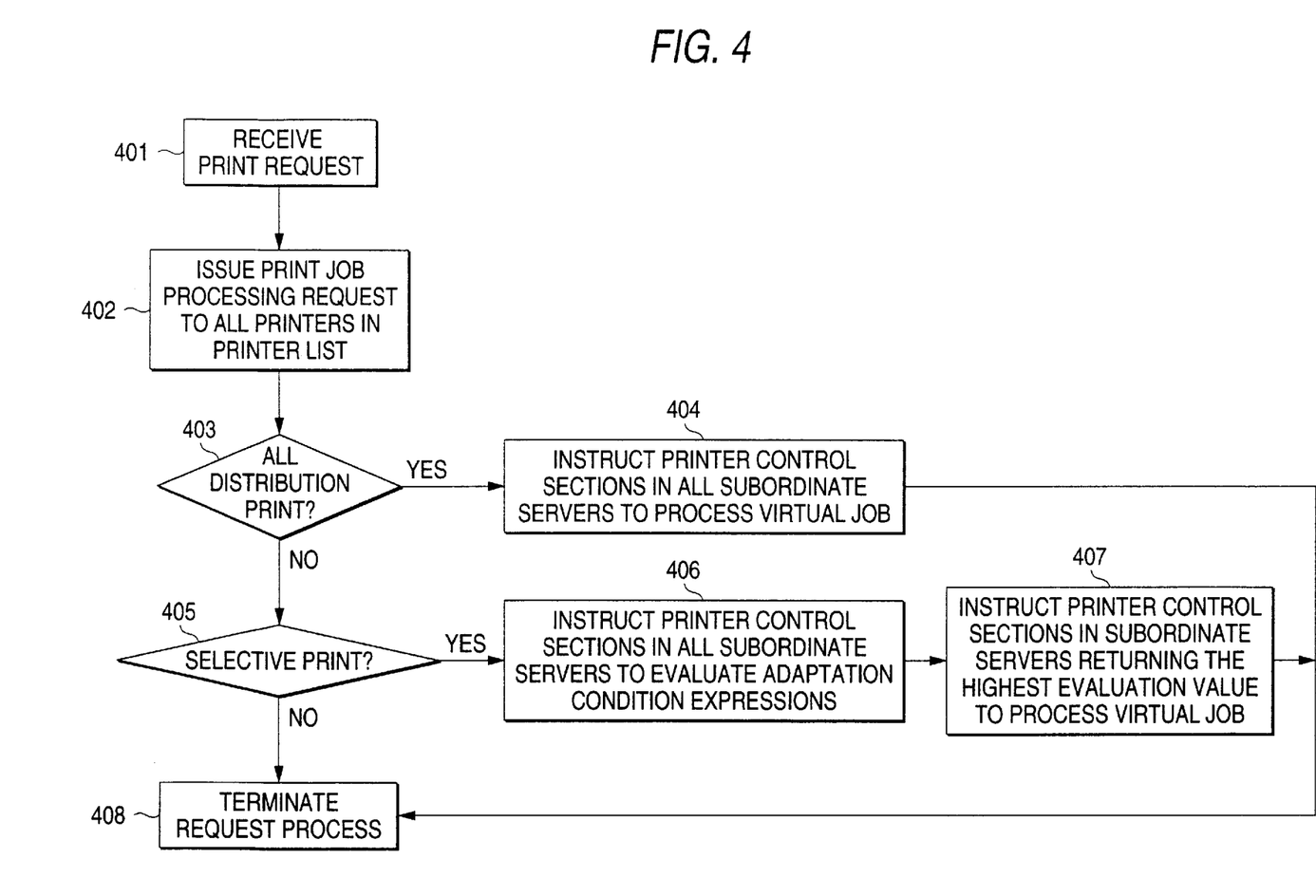
FIG. 4 is a flowchart to show a print instruction process request flow in the print control system of the present invention.

FIG. 4 is a flowchart to show a print instruction process flow in the print control system of the present invention. When a print request is made, the print control system of the present invention selects a printer for executing the print and executes print processing at the selected printer. At the time, the printer control section in the printer server having the printer generates a virtual job 2212 corresponding to a print job 2211 generated in making the print request. Actual print processing is executed based on the virtual job 2212 generated.

First, when the job management server 22 receives a print instruction request from the print instruction system 21 at step 401, it issues a print job processing request to all print servers having printers in the printer list at step 402. Next, whether or not the print request from the print instruction system 21 specifies all distribution print with all printers in the printer list as print execution printers is determined at step 403 based on a print parameter or the attribute value attached thereto sent from the print instruction system 21 in making the print request. If the print request is all distribution print, the printer control sections in all print servers are instructed to perform virtual job processing at step 404.

If the determination at step 403 is No, control goes to step 405 and whether or not the print request is selected print is determined. The selective print means a request for printing only at the printers satisfying a specific condition. For example, the selective print is applied to print only at color printer, print involving paper folding, or any other special print. If it is determined at step 405 that the print request is selective print, control goes to step 406 and the printer control sections in the print servers are instructed to evaluate adaptation condition expressions. The adaptation condition expressions are attributes contained in the print job 2211 generated in response to the print request as described above. Next, at step 407, a virtual job enabling request is sent to the printer control section in the print server returning the highest evaluation value in the adaptation condition expression evaluation at step 406. Then, the print instruction request process is terminated. As a result of the flow, print processing is executed in the print server to which the virtual job enabling request is sent.

Figure 5:
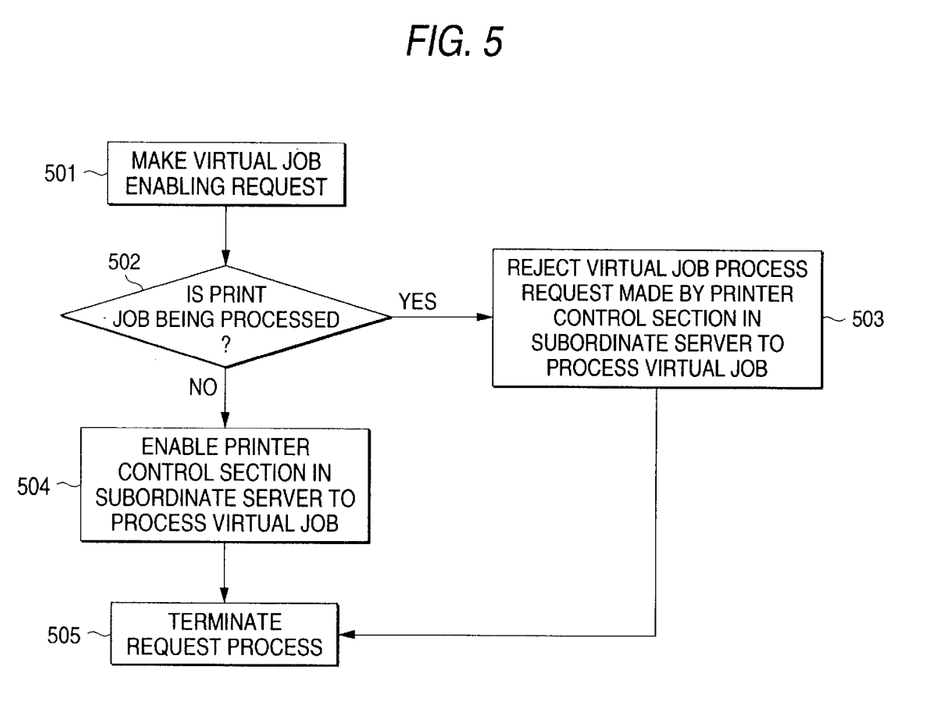
FIG. 5 is a flowchart to show a virtual job enabling process flow in the print control system of the present invention.

FIG. 5 shows a virtual job enabling request process flow. The virtual job 2211 retains the print object ID and virtual job state as attributes. It is a job generated by the printer control section in the print server in response to the print job processing request from the print job control section 222 in the job management server 22 in print job processing. The print server is enabled to execute print processing by entering the virtual job state of the virtual job 2212 into the "processing wait" state.

First, when a virtual job enabling request is made by the print server at step 501, whether or not processing of the print job 2211 corresponding to the virtual job 2212 is already being executed is determined at step 502.

Whether or not a virtual job enabling request is made by the print server may be determined as follows: For example, when each print server becomes printable, it outputs a virtual job enabling request signal and the signal is detected by the job management server 22 or identification data of a flag, etc., indicating the printable state of each print server is detected by the job management server 22, whereby the identification data is checked to see if a virtual job enabling request is made by each print server.

If the determination at step 502 is Yes, namely, print processing is already executed, it is not necessary to again execute print processing of the same print job. Thus, at step 503, the printer control section in the print server issuing the virtual job enabling request is notified that the virtual job process request is rejected and that print processing is not required. If the determination at step 502 is No, namely, the print job is in the processing wait state, control goes to step 504 at which the printer control section in the print server virtual job 2212 so as to execute print processing involved in the virtual job 2212. Then, the request process is terminated at step 505.

Figure 6:
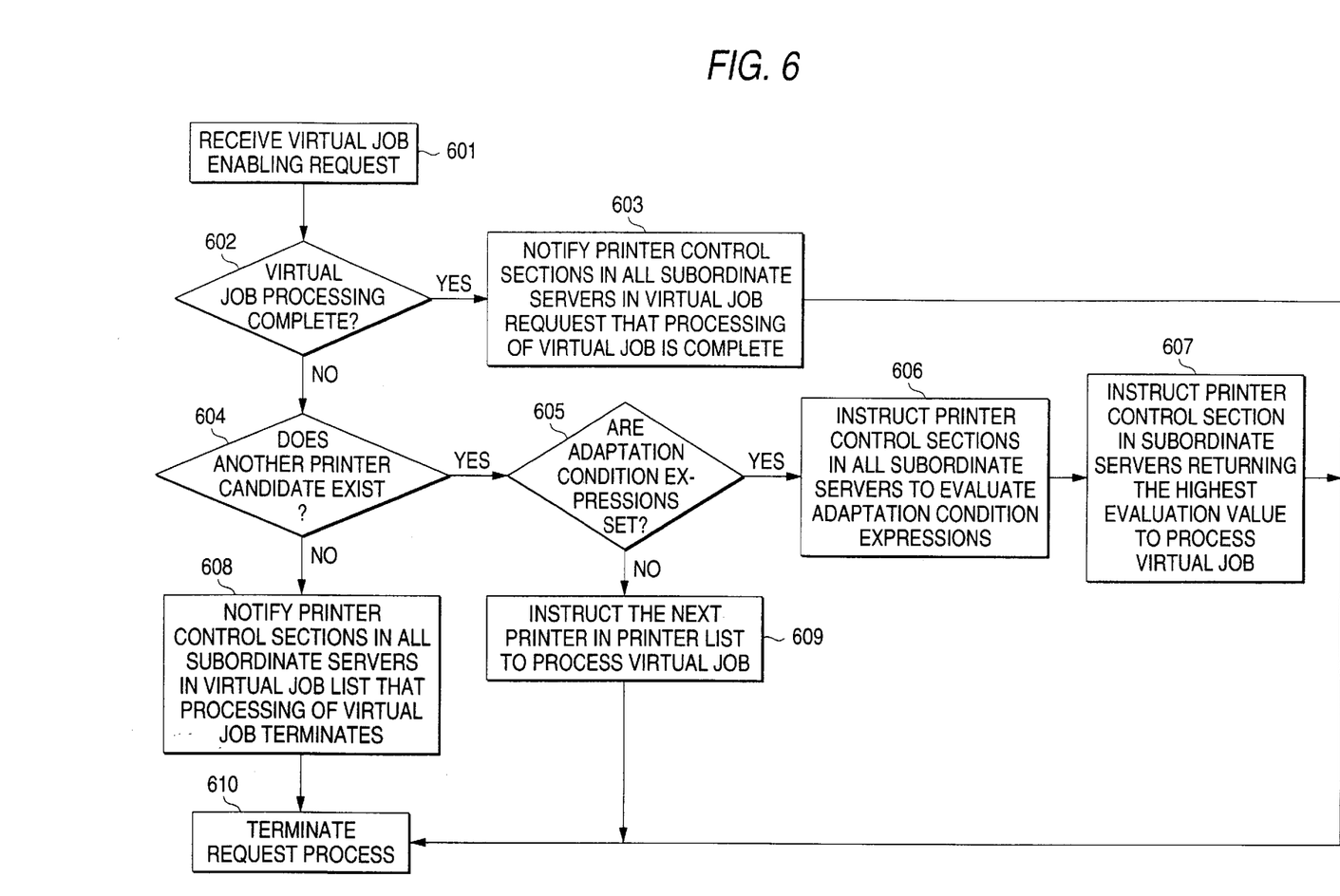
FIG. 6 is a flowchart to show a virtual job release process flow in the print control system of the present invention.

Next, a process flow executed when a virtual job release request is made will be discussed with reference to FIG. 6. This process is a process accompanying a request issued by the printer control section in the print server to the print job control section 222 in the job management server 22 if it becomes impossible to continue processing due to some trouble occurring while the printer control section in the print server is processing a virtual job 2212.

When a virtual job release request is received from the print server at step 601, whether or not processing of the virtual job 2212 corresponding to the release request is already complete is determined at step 602. If processing is complete (Yes at step 602), control goes to step 603 and the printer control sections in all print servers in a virtual job list are notified that processing of the virtual job 2212 is complete. Thus, a new enabling request for the virtual job 2212 does not occur.

If the determination at step 602 is No, namely, processing of the virtual job 2212 is not yet complete, control goes to step 604 and whether or not another printer candidate exists is determined. If a printer capable of processing the print job 2211 exists, control goes to step 605 at which whether or not adaptation condition expressions are set is determined. The adaptation condition expressions are contained as attributes in the print job 2211. If adaptation condition expressions are set, control goes to step 606 at which the printer control sections in the print servers are instructed to evaluate the adaptation condition expressions. Next, at step 607, a virtual job enabling request is sent to the printer control section in the print server returning the highest evaluation value in the evaluation at step 606. Then, the print instruction request process is terminated. If it is determined at step 605 that adaptation condition expressions are not set, control goes to step 609 and the next printer in the printer list is instructed to perform processing of the virtual job 2212. If it is determined at step 604 that another printer candidate does not exist, control goes to step 608 and the printer control sections in all print servers in the virtual job list are notified that job processing terminates. Then, the request process is terminated at step 610.

Figure 7:
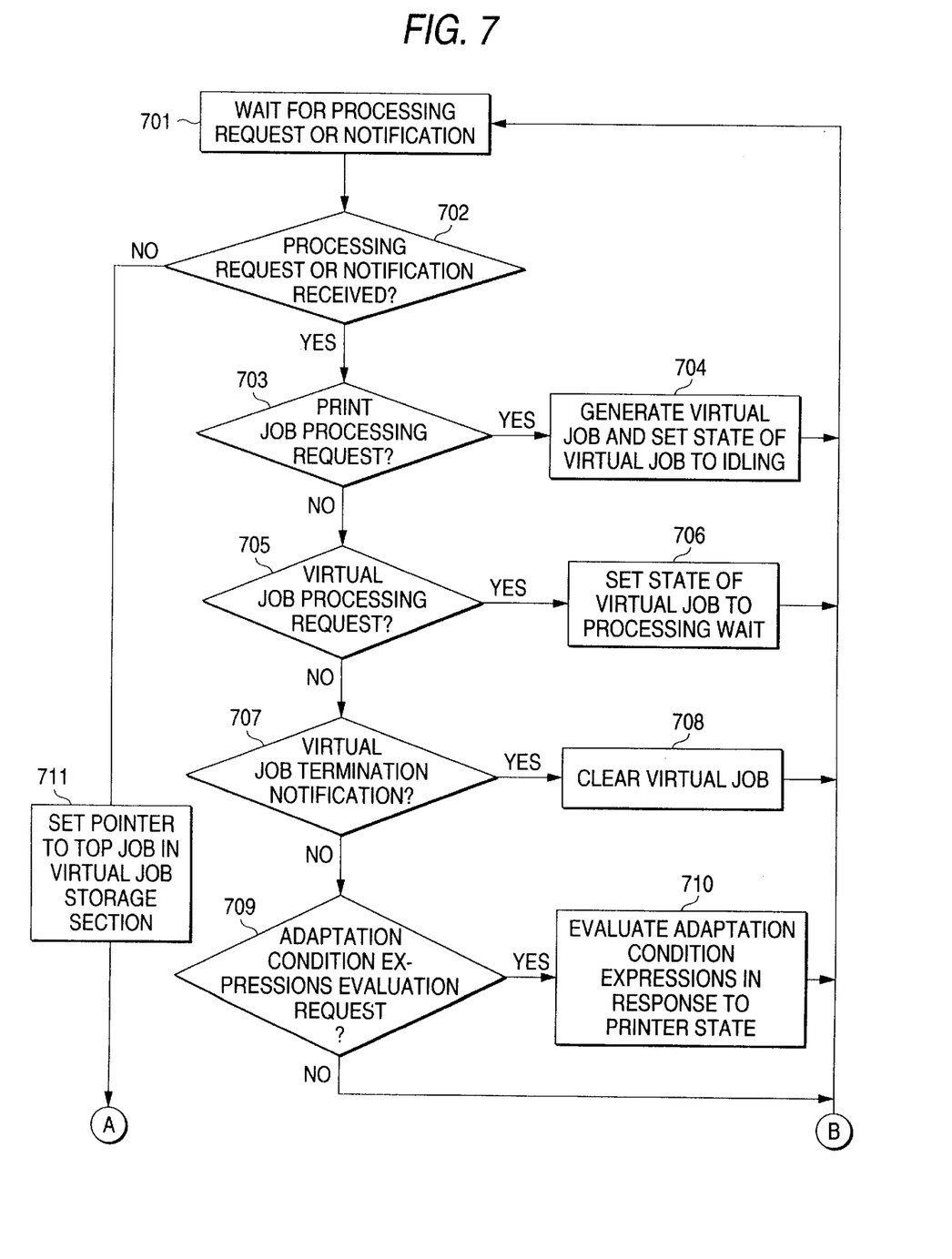
FIG. 7 is a flowchart (No. 1) to show a process flow in a print server in the print control system of the present invention.
Figure 8:
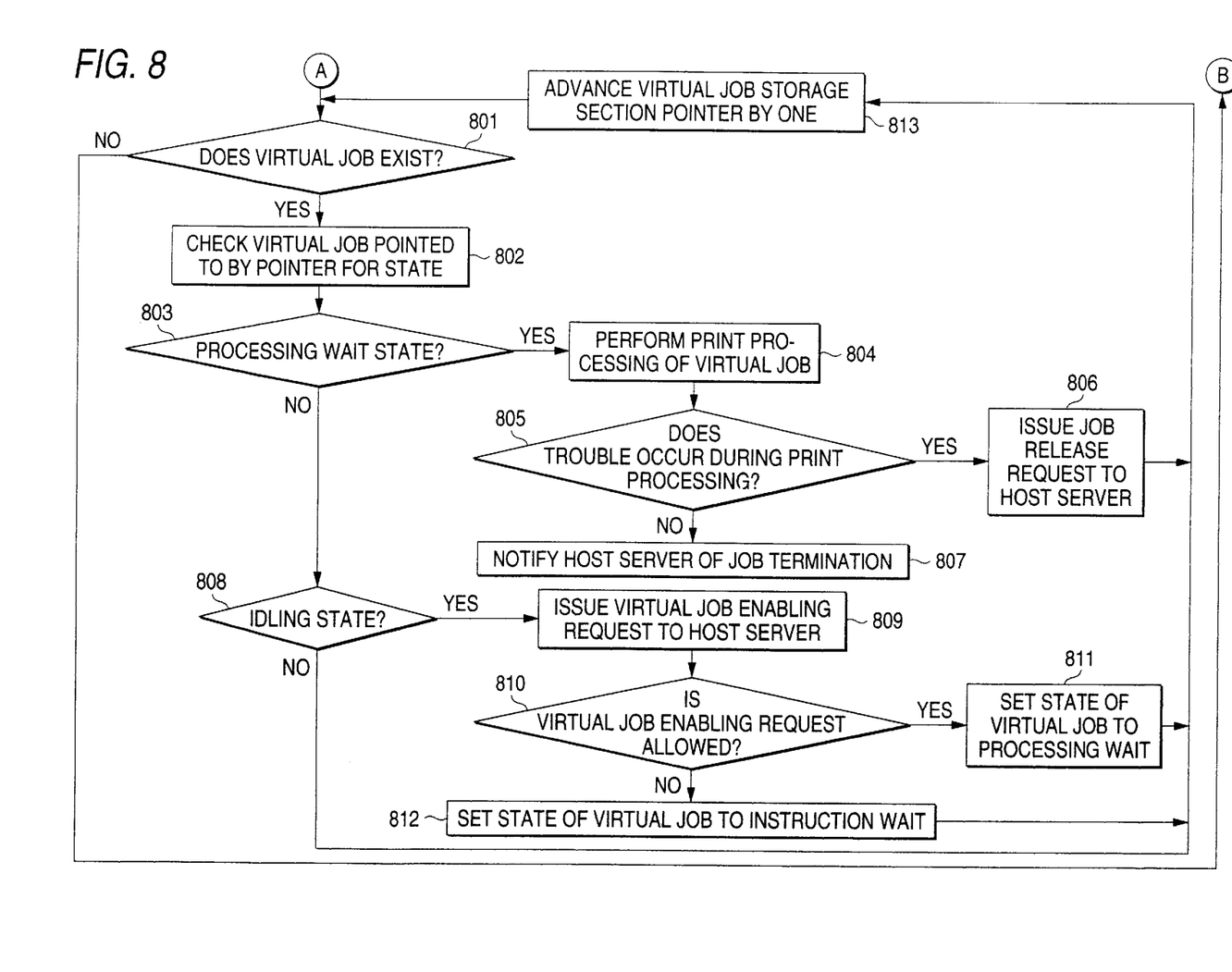
FIG. 8 is a flowchart (No. 2) to show a process flow in the print server in the print control system of the present invention.

Next, a processing flow in the print server having a printer for executing actual print processing will be discussed with reference to FIG. 7 and FIG. 8.

Process requests and notification sent to the print server are a print job processing request, a virtual job enabling request, a virtual job termination notification, and an adaptation condition expression evaluation request. First, at step 701, a wait is made for a process request or notification and at step 702, whether or not a process request or notification is received is determined.

If the received request is a print job processing request at step 703, control goes to step 704 at which a virtual job 2212 corresponding to the print job 2211 is generated and the job state of the virtual job 2212 is set to "idling," namely, a state in which processing for the virtual job is not determined. When the virtual job 2212 becomes to be processed, a job enabling request is issued to the print job control section 222 in the job management server 22.

If the received request is a virtual job enabling request at step 705, control goes to step 706 at which the job state of the virtual job 2212 is set to "processing wait" state.

If a virtual job termination notification is received at step 707, control goes to step 708 at which the virtual job 2212 stored in the virtual job storage section is cleared.

If the received processing request is an adaptation condition expression evaluation request at step 709, control goes to step 710 at which adaptation condition expressions are evaluated in response to the printer state in the print server.

If it is determined at step 702 that a process request or notification is not received, control goes to step 711 to execute processing of the virtual job 2212 retained in the virtual job storage section at present. At step 711, a pointer is set to the top job in the virtual job storage section. Next, at step 801, whether or not a virtual job exists is determined. If a virtual job does not exist (No at step 801), the process is terminated and control returns to step 701 for waiting for a processing request or notification.

If the determination at step 801 is Yes, namely, a virtual job 2212 exists in the virtual job storage section, control goes to step 802 at which the top virtual job pointed to by the pointer is checked for job state. If the job state is "processing wait" (Yes at step 803), control goes to step 804 at which print processing of the virtual job 2212 is executed. When trouble occurs during the print processing at step 805 and it becomes impossible to continue the print processing, a job release request is issued to the job management server 22 at step 806. If the print processing is complete with no trouble occurring at step 805, the job management server 22 is notified of the job termination at step 807.

If the job state of the virtual job 2212 is not "processing wait" at step 803 and "idling" at step 808, a job enabling request is issued to the job management server 22 at step 809. If acquiring the virtual job 2212 results in a success at step 810, the job state of the virtual job 2212 is changed to "processing wait" at step 811. If the job state of the virtual job 2212 is not "idling" at step 808, control returns to step 701.

If acquiring the virtual job 2212 results in a failure at step 810, control goes to step 812 at which the job state of the virtual job 2212 is set to "instruction wait" and control returns to step 701.

When the processing of the virtual job 2212 pointed by the pointer at present is terminated, control goes to step 813 and the pointer is set to next virtual job in the virtual job storage section.

The embodiment of the print control system and the print control method of the present invention has been described. However, the print control system of the present invention is not limited to the configuration shown in the embodiment in FIG. 1 or FIG. 2 and may have a configuration wherein a larger number of print servers and print instruction systems may be connected, for example.

In the description, for simplicity, the job management server, the print servers, and the print instruction system have independent functions in the embodiment. However, as described above, in the print control system and method of the present invention, for example, the print instruction system may be provided with the job management server function without providing a separate job management server or may be connected only to the job management server connected to the network without being connected directly to the network. Further, the print server and printer can also be realized by providing the print server function for the printer without installing them separately. The member connected configuration on the network is not limited to that shown in the embodiment and if data transfer required between the members is enabled on the network in the configuration, the print control system and method of the present invention can be realized.

As has been described heretofore, the print control system and method according to the present invention provide the following advantages:

(i) Selection of printer with light load

The print job control section 222 in the job management server 22 issues a print job processing request to all printers in the printer list specified in a print job 2211 and a virtual job 2212 is generated in each printer received the request, whereby the print job control section 222 can permit the printer control section in the print server first issuing a job enabling request to process the virtual job 2212. According to the configuration, the printer that can first process the print job 2211 can be selected reliably from among the printers in the printer list.

(ii) Simultaneous output to printers

The print job control section 222 in the job management server 22 issues a print job processing request is issued to all printers in the printer list specified in a print job 2211 and a virtual job 2212 is generated in each printer received the request, whereby the print job control section 222 permits the printer control sections in all the print servers issuing a job enabling request to process the virtual job 2212. According to the configuration, simultaneous output at all printers in the printer list can be executed.

(iii) Selection of optimum printer for printing out

The print job control section 222 in the job management server 22 issues a print job processing request is issued to all printers in the printer list specified in a print job 2211 and a virtual job 2212 is generated in each printer received the request, then the print job control section 222 makes a request for evaluating printer adaptation condition expressions. In response to the request, the printer control sections in the print servers evaluate the operation state based on the printer adaptation condition expressions, then return the evaluation result to the print job control section, which then permit the printer control section providing the optimum evaluation to process the virtual job based on the results returned from all the printer control sections. According to the configuration, output to the optimum printer is enabled in response to the print job.

(iv) Changing printers for printer out

If it becomes impossible to continue processing due to some trouble occurring while the printer control section in the print server is processing a virtual job 2212, the printer control section in the print server issues a job release request to the print job control section 222 in the job management server 22. In response to the request, the print job control section 222 selects a printer as another candidate for printing out from the printer list in the print job 2211 and sends a virtual job enabling request to the printer control section of the selected printer. When selecting the candidate for printing out, if the print job 2211 contains printer adaptation condition expressions, the print job control section 222 again requests the printer control sections to perform evaluation at the point in time, then sends a virtual job enabling request to the printer control section providing the optimum evaluation based on the evaluation results returned from all printer control sections. According to the configuration, the optimum printer to change to can be selected efficiently.

(v) Decreasing of resources required for print processing

When a virtual job 2212 is processed, the print object is shared by all printer control sections. Thus, each printer control section need not retain a copy of the print object containing print data required for printing and the resources required for the printers can be decreased. Since the printer control sections do not have the print object copy, print object synchronization need not be established. Thus, in changing the printers for printing out, processing of the print object can be easily restarted at the processing interrupt time.

What is claimed is:

1. A print control system comprising:
    a print instruction system issuing a print request for printing a print object; and
    a plurality of print servers connected to the print instruction system through a data communication network, the respective print server having a print processing device for printing out the print object,
    wherein the print instruction system outputs a print job processing request as the print request to the plurality of print servers and transfers the print object to a first print server which reply a printable response in response to the print job processing request, and
    wherein each of the print servers generates and memorizes a virtual job corresponding to the print request in response to the print job processing request, and outputting the printable response at the time of being ready for processing the virtual job.

2. The print control system as set forth in claim 1, wherein the print instruction system includes a job management server which generates and memorizes a print job containing an attribute data including selection information for the print processing device executing the print request.

3. The print control system as set forth in claim 2, wherein the job management server includes a virtual job list for relating a plurality of virtual jobs generated by the print servers to the print job and indicating the correspondence between the virtual jobs and generating print servers, and selects a print server generating a virtual job corresponding to the print job with reference to the virtual job list.

4. The print control system as set forth in claim 2, wherein the job management server instructs the first print server to process the virtual job and transfers the print object thereto.

5. The print control system as set forth in claim 4, wherein the job management server instructs print servers other than the first print server to put the processing of the virtual job on hold.

6. The print control system as set forth in claim 2, wherein the job management server instructs all print servers replying the printable response to process the virtual job and transfers the print object thereto.

7. The print control system as set forth in claim 2, wherein the print job contains adaptation condition expressions for calculating an evaluation value to select a candidate print server for processing the virtual job, and
    wherein the print server calculates the adaptation condition expressions to determine the evaluation value based on operation state of the print processing device attached thereto and notifying the evaluation value to the job management server, and the job management server selects the candidate print server based on the evaluation value.

8. The print control system as set forth in claim 2, wherein the print server processing the virtual job issues a virtual job release request to the job management server when the output of the print object is interrupted, and thereby the job management server selects next print server for processing the interrupted virtual job based on the selection information for the print processing device executing the print request contained in the print job and instructs the selected print server to process the interrupted virtual job.

9. The print control system as set forth in claim 1, wherein the print server includes a virtual job storage section capable of storing a plurality of virtual jobs, selects one virtual job from the plurality of virtual jobs, and is operated by a job state data contained in the selected virtual job.

10. The print control system as set forth in claim 9, wherein the job state data having a value as a data indicating one state of "processing", "processing wait", "instruction wait", and "idling", and wherein the print server executes the process of the virtual job with the print processing device attached thereto when the job state indicates the "processing wait", notifies the printable response to the print instruction system when the job state data indicates the "idling", and selects another virtual job stored in the virtual job storing section and executes a process of the next virtual job with reference to a job state data contained by the next virtual job when the job state data indicates one of the "processing" and "instruction wait".

11. The print control system as set forth in claim 2, wherein the job management server includes a print object storage section for storing the print object containing a print data, and the print servers load the print object from the print object storing section when the processing of the virtual job is instructed by the job management server.

12. The print control system as set forth in claim 2, wherein the print servers output a printable response signal as the printable response at the time of being ready for processing the virtual job.

13. The print control system as set forth in claim 2, wherein the print servers output a identification data indicating whether the virtual job can be processed as the printable response.

14. A method for controlling a printing with respect to a printing control system which comprises:

a print instruction system issuing a print request for printing a print object; and a plurality of print severs connected to the print instruction system through a data communicates network, the respective print server having a print processing device for outputting the print object, comprising the steps of:

outputting a print job processing request as the print request from the print instruction system to the plurality of print servers;

generating and memorizing a virtual job corresponding to the print request in response to the print job processing request in each of the print servers;

outputting a printable response in response to the print job processing request from the each print server to the print instruction system when the each print server becomes ready for processing the virtual job;

transferring the print object from the print instruction system to a first print server which reply the printable response; and printing out the print object by the print processing device connected to the first print server.

15. The print control method as set forth in claim 14, wherein the print instruction system instructs print servers other than the first print server to put the process of the virtual job on hold when the print object is transferred to the first print server.

16. The print control method as set forth in claim 14, wherein the print instruction system instructs print servers other than the first print server to cancel the process of the virtual job after printing out of the print object.

17. The print control method as set forth in claim 14, wherein the print instruction system transfers the print object a first print server among the print servers other than the first print server when the printing out of the print object is interrupted.

* * * * *